June 17, 1969     C. J. GAISER     3,450,494
AMORPHOUS SODIUM SILICATE HAVING INHERENT BINDING
PROPERTIES AND METHOD OF PRODUCING SAME
Filed July 18, 1967

*INVENTOR.*
Conrad J. Gaiser

BY *Stanley Bialot*

United States Patent Office 3,450,494
Patented June 17, 1969

3,450,494
AMORPHOUS SODIUM SILICATE HAVING INHERENT BINDING PROPERTIES AND METHOD OF PRODUCING SAME
Conrad J. Gaiser, 24 66th Place,
Long Beach, Calif. 90803
Continuation-in-part of application Ser. No. 352,142, Mar. 16, 1964. This application July 18, 1967, Ser. No. 654,230
Int. Cl. C01b *33/32*
U.S. Cl. 23—110
8 Claims

ABSTRACT OF THE DISCLOSURE

Amorphous sodium silicate having a burr-like structure imparting inherent binding properties thereto, is prepared by heating an aqueous sodium silicate dispersion and spraying the dispersion under pressure into an expansion zone of lower pressure to effect a water loss solely by substantially instantaneous flashing off of water without application of heat. The product has good insulating properties, and because of its inherent binding properties, it can be compressed into tablets.

DISCLOSURE

The instant application is a continuation-in-part of applicant's copending application, Ser. No. 352,142, filed Mar. 16, 1964, for "Amorphous Sodium Silicate, and Method of Producing Same."

This invention concerns sodium silicate, and more particularly novel amorphous sodium silicate having inherent binding properties, its method of production and its uses.

Because of their desirable soil removal and soil suspending properties, sodium silicates are widely employed in laundering products. The alkalinity imparted by the sodium oxide component fulfills many functions. It serves to neutralize acids, saponify fats or oils, and enhance the detersiveness of soaps and other surfactants, such as alkyl aryl sulfonates and non-ionic detergents, which are formed or added. The silica component serves to suspend removed soil, preventing redeposition.

As is well known, the sodium oxide ($Na_2O$) to silicon dioxide ($SiO_2$) ratio varies widely in the various sodium silicates. Sodium metasilicate has a mol ratio of $Na_2O$ to $SiO_2$ of 1 to 1; sodium sesquisilicate, a mol ratio of 1 to 0.67 and sodium orthosilicate, a mol ratio of 1 to 0.5. The latter, because of its high alkali to silica mol ratio is commonly employed for commercial laundering. Heretofore, all these sodium silicates have been of crystalline nature.

Even at elevated temperatures, crystalline sodium orthosilicate is only slowly solubilized in water, and much of the orthosilicate is not available as a colloid to provide soil suspension. Similarly, the crystalline meta- and sesquisilicates are even more slowly solubilized, suffering from the same disadvantages as the orthosilicate.

This invention has as its objects, among others, the preparation of a novel physical form of sodium silicate which is rapidly dispersible in water to form highly colloidal solutions having improved soil suspension properties, namely, burr-like, spongy amorphous sodium silicates of varying $Na_2O$ to $SiO_2$ mol ratios, and to an economical, simple and rapid method for forming sodium silicate particles from an aqueous liquid mass of sodium silicate without the application of heat or drying gas for spray drying the same.

The burr-like, spongy amorphous sodium silicates prepared by the process of this invention also have excellent inherent binding properties to form integral masses when compressed, such as tablets and briquettes without requiring extraneous binders or the removal of moisture by heat or other extraneous means. It has other valuable physical characteristics, particularly light density suitable for insulation purposes, not typical of crystalline sodium silicates. Other objects of the invention will become apparent from the following description, and drawing in which:

FIG. 3 is a similar view of a sodium silicate particle resulting from spray drying.

According to this invention, some of the water in an aqueous liquid dispersion or suspension of sodium silicate in which the water is superheated, is flashed off at an elevated temperature, by forcing such heated dispersion from a zone of relatively high pressure into a static unheated expansion zone of relatively low pressure. The flashing off of the water is effected so rapidly without application of heat that the resultant sodium silicate droplets thus formed have insufficient time to crystallize while expanding to burr-like, spongy masses, and instantly cool to amorphous state.

The released water vapor is simultaneously vented, and solid amorphous free-flowing sodium silicate particles are formed and collected without further application of heat or drying by heated gas or air. If spray drying were employed by application of external heat, the particles would pop open, thus losing their binding properties. In this connection, it is only necessary to flash off sufficient water so that the resultant spongy, burr-like particles are solids at ambient temperatures and pressures.

Figure 1:
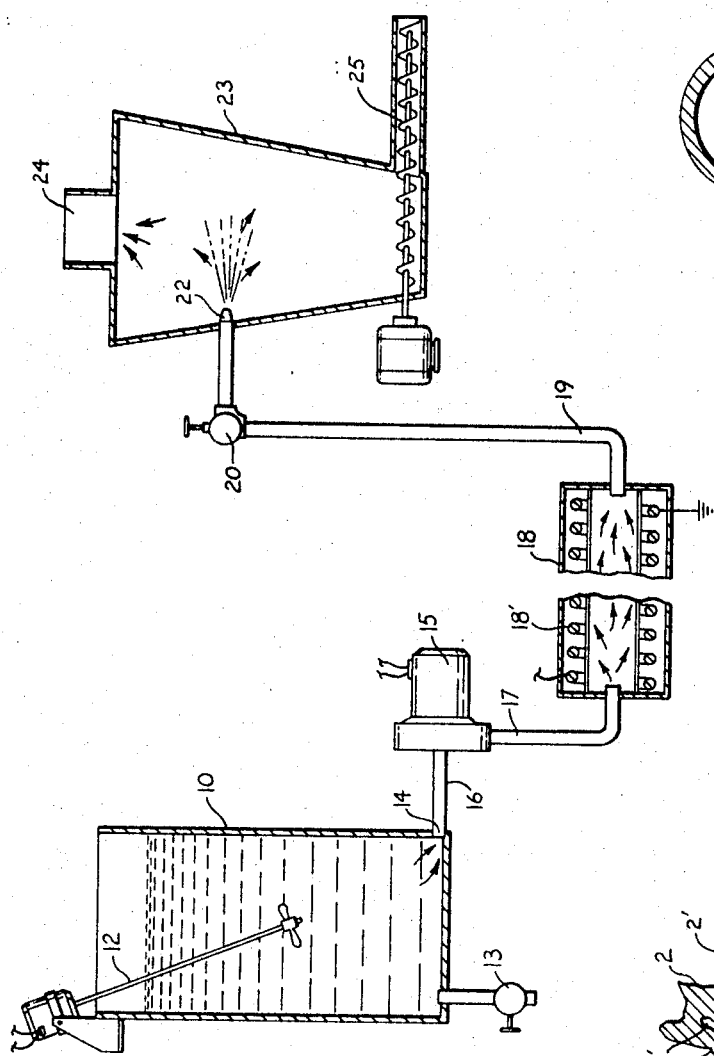
FIG. 1 is a schematic view of a form of apparatus for forming the amorphous sodium silicate hereof.
Figure 1:
Figure 2:
FIG. 2 is a pictorial cross-sectional view magnified about 20 times, illustrating a spongy, burr-like particle of the product hereof.

FIG. 2 illustrates pictorially the burr-like, spongy character of a particle of sodium silicate resulting from the method hereof. It has projecting spurs 2 which form an irregular outline, and minute voids 2' which impart sponginess. The surface is not glazed or glassy which would otherwise result from application of heat, as in spray drying. Thus, when a multiplicity of particles are compressed together, the burrs enhance binding for formation of pellets or briquettes. In contradistinction, as shown in FIG. 3, a spray dried particle is substantially a hollow sphere with an opening 3 through which steam has escaped. The outer shell surface 4 of the sphere is hardened and glazed, and much harder than the inner surface 5. Compression on a plurality of particles results in crushing to a fine dense powder having no inherent binding properties.

The sodium silicate employed in the dispersion may be preformed sodium silicate, or may be formed in situ from the components which make up sodium silicate, namely, sodium oxide and silicon dioxide. Hence, sodium silicate referred to herein is meant to include both sources.

For most advantageous uses, the amorphous sodium silicates of this invention have mol ratio ranges of sodium oxide ($Na_2O$) to silicon dioxide ($SiO_2$) of about 1 to 0.5, to 1 to 5.0. By varying the ratios of the $Na_2O$ to $SiO_2$, the products have different properties which make them applicable for a variety of uses. Ratios of $Na_2O$ to $SiO_2$ of 1 to 2, to 1 to 3 are advantageous for domestic laundering uses. Decreasing the amount of $Na_2O$ so that the mol ratio of $NaO$ to $SiO_2$ is substantially less than 1 to 3 provides products having good insulating properties. Preferred mol ratio ranges of $Na_2O$ to $SiO_2$ are 1 to 0.5 to 1 to 3 for domestic and commercial laundering uses, while 1 to 3, to 1 to 5.0 for insulation purposes. However, the method of this invention is not dependent on the molar ratios of $Na_2O$ to $SiO_2$, as various well known ratios can be employed to produce the burr-like spongy amorphous sodium silicate.

The physical properties of the amorphous sodium silicates hereof may be varied by the amount of water contained therein. Usually the weight percent of water will be in the range of 15 to 30, more usually in the range of 18 to 26. Increasing amounts of water result in lower melting points, greater plasticity and greater rates of solubility, while decreasing amounts of water result in higher melting points, less plasticity, and rapidly decreasing solubility.

As previously mentioned, the particles as prepared are non-crystalline, and appear as having a rugged burr-like nature. They generally range from 5 to 150 mesh size, more usually from 10 to 20 mesh size.

The bulk density of the novel amorphous particles, namely, the density of a mass of particles as formed, is usually in the range of 8 to 35 lbs./ft.$^3$, more usually in the range of 15 to 21 lbs./ft.$^3$. Such density is determined by the amount of water originally present, the amount of water flashed off, and the amount of water remaining. Under any given conditions, the more water flashed off, the lower will be the bulk density. The bulk densities of crystalline sodium silicates are in the range of 75 to 150 lbs./ft.$^3$. The amorphous particles hereof may, however, be compacted under pressure in conventional briquette or tablet forming apparatus to solid masses having densities as high as 65 lbs./ft.$^3$ or even greater. They may also be expanded to spongy substantially anhydrous masses, by quick heating to an elevated temperature, to provide particles suitable for insulation purposes.

As already stated, the novel burr-like, spongy amorphous sodium silicate particles of this invention are prepared by the rapid flashing off of water without application of heat, from an aqueous dispersion of sodium silicate while simultaneously venting off the flashed water. This is desirably done by ejecting the heated aqueous dispersion wherein the water is superheated and in liquid phase, at a relatively high temperature and pressure into an unheated expansion zone of much lower pressure, thus creating a pressure drop. The pressure drop will usually be at least about 500 p.s.i. As a result the particles formed are cooled so fast below their melting points as to preclude crystal formation and form the burr-like, spongy, amorphous particles.

Thep rocess will be furher described with the aid of the accompanying drawing which illustrates schematically a form of apparatus for continuously effecting the temperature and pressure drop. Various materials, namely, aqueous sodium silicate, water, sodium hydroxide, and a minor amount of the usual laundering additives if desired, such as borax, phosphates, brighteners or the like, as explained hereinafter, are introduced into a vessel 10 which is shown open but may be closed, provided with an agitator 12, drain 13 and outlet 14. The various components are continuously stirred to insure thorough mixing into a uniform slurry or dispersion, and then pumped under pressure by pump 15 through conduits 16 and 17 into a suitable heat exchanger 18, which may be of the electrical type having electrical heating means 18'.

After being heated to the desired temperature, the dispersion from heat exchanger 18 passes from the heat exchanger through conduit 19, manually operable flow regulator valve 20 controlling the rate at which the dispersion is fed, and conduit 21, and is then released by ejecting through restricted orifice or nozzle 22 into expansion vessel 23, maintained at a sufficiently lower pressure at ambient temperature than that of the dispersion introduced. Nozzle 22 is preferably not a multi-orifice spray head but is desirably a simple orifice nozzle. Also, the atmosphere in expansion zone 23 is static in that a moving column of gas is not required to effect extraneous drying of the resultant particles.

Substantially all moisture loss is effected by the flashing off of the water; and the water vapor produced is vented to the atmosphere through vent 24, while the dry, burr-like spongy amorphous sodium silicate particles are collected by screw conveyor 25 which conveys such particles to be packaged or used in any desired way. Because loss of water is effected solely by flash-off in expansion chamber 23, a tower is not required as in spray drying.

The temperature of the heat exchanger 18 need only be high enough to solubilize the sodium silicate dispersion or suspension fed in, and provide a homogeneous colloidal solution in which substantially all of the sodium silicate is uniformly dispersed, and to impart sufficient heat to the solubilized dispersion to flash off water when the solubilized dispersion is treleased into the lower unheated pressure zone 23 which is desirably at atmospheric pressure. As previously related, the pressure maintained by pump 15 throughout the system up to the discharge nozzle 22, is such as to maintain substantially all the water in the dispersion in the liquid phase.

To produce the burr-like, spongy sodium silicate by the aforementioned water flash-off method, the aqueous sodium silicate fed into the system must initially be a dispersion or slurry. Such dispersion should usually have 45 to 80 weight percent of sodium silicate or components which form the same, and desirably 50 to 75 weight percent to insure a dispersion because by the method hereof release of water is effected solely by flash-off of the water, and generally less than 50% water by weight of the original water content of the sodium silicate dispersion can be flashed off at one time in the expansion chamber. Hence, if the initial water content of the aqueous sodium silicate is such that a solution is initially fed into the system, the original water content will be too high and consequently not enough water can be flashed off at one time to form particles.

Generally, the temperatures used are in the range of about 125° to 358° C.; the latter temperature being the highest at which water will remain in the liquid phase at any pressure. More particularly, the temperature is in the range of about 135° to 175° C. The pressure, which must be at least sufficient to maintain the water in the liquid phase, will generally be in the range of about 500 to 5,000 p.s.i. more usually, in the range of 1,000 to 3,000 p.s.i.

The pressure in the expansion vessel need only be substantially lower than the pressure at which the aqueous sodium silicate solution is sprayed. Usually, the pressure will vary from atmospheric to 5 atmospheres; preferably the pressure will be 1 atmosphere (about 15 p.s.i.). Although the particular pressure is not critical, it should be low enough to allow the water to flash off or vaporize substantially instantaneously. In some instances, it may be advantageous to use sub-atmospheric pressure is generally in the range of 0.25 to 5 minutes, solution at a lower pressure and temperature. The time for which the reaction mixture is heated at the elevated pressure is generally in the range of 0.25 to 5 minutes, more usually in the range of 0.5 to 2 minutes.

The orifice size will be governed by the size of the equipment, the pressure differential, the rate of production of the amorphous sodium silicate, etc. The orifice size chosen will not only govern the rate at which the material can be processed, but also the size of the burr-like, spongy sodium silicate particles, assuming the other variables are held constant.

In some instances, the product may still contain too much water and appear gel-like and plastic at room temperature. If so, the product may then be again superheated at a suitable temperature and pressure to provide a pumpable dispersion which may be again released into the expansion zone in the manner described to effect further flashing off of water, providing a final amorphous product having a desired water content.

When forming the initial liquid dispersion, various sources of dry and liquid sodium silicates or components which form the same, may be used. An increase in the mol ratio of $Na_2O$ to $SiO_2$ can be obtained by using caustic soda (NaOH). The amount of water may be adjusted by the addition of water and the choice of the sodium silicate concentration. Commercial sources of sodium silicate are available which have mol ratios of $Na_2O$ to $SiO_2$ as high in SiO as 1 to 3.75.

As previously indicated, additives may be included with the aqueous sodium silicate dispersion, which are stable under the conditions of the process. Various well known additives, such as phosphates, borates, salts, clays or the like, can be included with the other materials in the aqueous sodium silicate dispersion so as to be incorporated in the final solid product.

While the invention is not to be limited to the following theoretical description, the process is considered to operate in the following manner. As the superheated solubilized aqueous dispersion discharges through the release orifice 22 from a zone of high pressure to one of lower pressure, a portion of the water contained, flashes to vapor. The rapid flash evaporation of the water and the subsequent rapid cooling of the solids do not provide sufficient time for the sodium silicate to crystallize, resulting in burr-like, spongy amorphous particles of a wide range of bulk densities and particle size. In all cases, the particles are non-crystalline amorphous, supercooled particles associated with the remaining unevaporated water.

The following examples will serve to further illustrate the process of the invention; the resultant products being all suitable for soil suspension in laundering.

Example I

Into vessel 10 was introduced 49.87 parts by weight of commercial "Calquartz SS–65" sodium silicate powder by Philadelphia Quartz Company (the $Na_2O$, $SiO_2$ and $H_2O$ content being 23.1, 74.4, 2.5 weight percent, respectively); 49.43 parts by weight of 50 weight percent aqueous caustic soda (NaOH); and 9.5 parts by weight of anhydrous caustic soda. The mixture was heated to 154° C. in heat exchanger 18, maintained at that temperature for a residence time of one minute at 1,500 p.s.i. pressure until it reached nozzle 22, and then was released through a ⅜₄" orifice into unheated expansion zone 23 maintained at atmospheric pressure and ambient temperatures. The product was solid amorphous sodium silicate of a bulk density of about 16 lbs. per cubic foot, having a water content of about 22.5 weight percent, and a $Na_2O$ to $SiO_2$ mol ratio of about 1 to 1.

Example II

Into vessel 10, as in Example I, was introduced 100 parts of a 35° Baumé solution of commercial "Calquartz S–25" by Philadelphia Quartz ($Na_2O$ to $SiO_2$ ratio being 1 to 3.75) which was heated to 165° C., maintained at that temperature for one minute at 1,500 p.s.i. pressure, and then released as described in Example I. The product was barely a plastic gel at room temperature having about 35% water content by weight. The product was put through the process under the same conditions as in the first pass, reducing the water content to about 22% by weight. The particles had a mol ratio of $Na_2O$ to $SiO_2$ of 1 to 3.75 and were lightweight granular, slowly water-soluble and free flowing, of a bulk density of about 20 lbs. per cubic foot.

When heated quickly to 350° F., the particles expanded into spongy masses of an anhydrous nature of a bulk density of 2 lbs. per cubic foot, which had valuable insulating properties.

Example III

Into the vessel was introduced 45 parts of commercial "N Brand" liquid by Philadelphia Quartz (38 weight percent aqueous sodium silicate, $Na_2O$ to $SiO_2$ being 1 to 3.2); 35 parts dry sodium silicate powder ($Na_2O$ to $SiO_2$ being 1 to 3.2); 20 parts of 50 weight percent aqueous caustic soda; and 10 parts of trisodium phosphate ($Na_3PO_4 \cdot 5H_2O$). The mixture was heated for about one minute at 165° C. under 1,500 p.s.i. pressure and then released through a ⅜₄" diameter orifice to atmospheric pressure at ambient temperature. The product had about 25 weight percent water and a $Na_2O$ to $SiO_2$ mol ratio of 1 to 2.6. The bulk density was about 12 lbs. per cubic foot.

Example IV

A mixture was prepared from 67.5 parts of an aqueous sodium silicate (62 weight percent water, $Na_2O$ to $SiO_2$ being 1 to 3.2), 23.3 parts of anhydrous sodium carbonate and 7.5 parts of sodium tripolyphosphate, heated for about 1 minute to 125° C. and sprayed at 1,800 p.s.i. pressure through a ⅜₄" orifice into the expansion zone at atmospheric pressure and ambient temperature. The product had a bulk density of about 12 lbs. per cubic foot, was similar in appearance to that of Example III, and had a $Na_2O$ to $SiO_2$ mol ratio of 1 to 2.6.

Example V

A mixture was prepared from 60 parts of the aforementioned "Calquartz SS–65," and 40 parts of 50 weight percent aqueous sodium hydroxide. The mixture was heated to 150° C. for about 1 minute and sprayed at 1,700 p.s.i. through a ⅜₄" orifice into an atmospheric pressure zone at ambient temperature. The product contained 20% moisture and had a $Na_2O$ to $SiO_2$ mol ratio of 1:1.44, and a bulk density of about 20 lbs. per cubic foot.

Example A

As already indicated some of the novel products of this invention find particular use in laundering materials as binders and for soil suspension.

About 91 percent by weight of the product from Example III (25% moisture, $Na_2O$ to $SiO_2$ of 1 to 2.6 mol ratio) was blended with 8 percent by weight of a suitable surfactant, namely, nonylphenol to which 9.5 mols of ethylene oxide had been added, and 1 percent by weight of a conventional mixture of perfumes, optical brighteners and carboxymethylcellulose. When the mixture was compressed in a conventional briquette forming press, into briquettes (3 inches in diameter and 1 inch thick) to a bulk density of about 50 lbs. per cubic foot, a stable rugged non-crumbling tablet was obtained in which the mass was adhesively bonded by virtue of the inherent binding properties of the amorphous sodium silicate. Yet, the tablet was rapidly soluble in water and had cleaning characteristics comparable to compositions using surfactants and phosphate.

Moreover, mixtures containing as low as 20 percent by weight of the sodium silicate product of Example III formed suitable detergent tablets bound together by the amorphous sodium silicate, when blended with 80% by weight of conventional laundering additives.

Example B

The following two examples show widely varying detergent compositions utilizing the novel amorphous sodium silicate of this invention. Laundry detergent tablets were prepared having the following composition:

(a)

| | Weight percent |
|---|---|
| Amorphous sodium silicate ($Na_2O$ to $SiO_2$: 1 to 2.6; 25 weight percent $H_2O$) | 81 |
| Dodecyl benzene sulfonate-sodium salt (anionic detergent) | 18 |
| Optical brightener (Blancophor DS) | 0.01 |
| Perfume (Florosynth Lab's Honeysuckle 90) | 0.49 |
| Carboxymethylcellulose [1] (thickener) | 0.50 |

(b)

| | Weight percent |
|---|---|
| Amorphous sodium silicate (Na₂O to SiO₂; 1 to 2.6; 25 weight percent H₂O) | 23.5 |
| Sodium polypropylene benzene sulfonate (detergent) | 15.0 |
| Sodium tripolyphosphate | 40.0 |
| Soda ash | 20.0 |
| Optical brightener (Blancophor DS) | 0.01 |
| Perfume (Florosynth Lab's Honeysuckle 90) | 0.49 |
| Carboxymethylcellulose¹ | 1.00 |

¹ Optional.

In equipment regularly used to produce tablets, each of these compositions was formed into tablets useful as premeasured laundry detergents. Tablet formation was easier than with most powders, as little or no lubricant was needed. The tablets formed were unusually resistant to mechanical damage, and could be handled with the usual packaging equipment without difficulty.

Another method of producing a useful tablet employing the novel amorphous sodium silicate is to compress a mixture similar to those described above, but omitting the detergent. The tablet is immersed in a suitable liquid non-ionic surfactant, such as nonylphenoxy polyethylene oxide, until the desired weight of the surfactant is absorbed, usually about 4 to 15% by weight, preferably about 6 to 8%. A surfactant of suitable properties will absorb near the surface where it will reinforce and protect the structure of the tablet and be more rapidly solubilized into the use solution than is the rest of the tablet, a sequence of application which promotes good laundering.

A tablet is formed which does not require wrapping and is readily dispensed from automatic vending devices. Other types of well known surfactants for imparting detersiveness to the tablets can be incorporated therein in the same manner.

Example C

The amorphous sodium silicates are also useful for dishwashing tablets. This use is exemplified by a tablet having the following composition: 98 parts amorphous sodium silicate (Na₂O to SiO₂ of 1 to 2.6 mol ratio, 25 weight percent water), 1 part trisodium ethylene diamine tetraacetic acid (sequestering agent), and 1 part "Surfonic LF-7" (Jefferson Chemical Company's low foam non-ionic surfactant). This product was used in a home dishwasher, one tablet weighing 8 grams being used each load. Excellent results were consistently obtained.

It is evident from the foregoing examples that the amorphous sodium silicates of this invention can be combined with a wide variety of surfactants to produce valuable laundering and dishwashing powders, and also tablets. These amorphous sodium silicates have particularly desirable properties of binding together surfactants and other conventional laundry or dishwashing compound ingredients to form stable, rugged masses wherein the amorphous sodium silicate will rapidly dissolve in water and provide superior soil suspension properties. With molar ratios of SiO₂ to Na₂O greater than 3 to 1, good insulating materials are obtained.

In addition to the surfactants set forth in the foregoing examples, other typical surfactants that can be employed usually in an amount of about 4 to 15% by weight, as previously mentioned, although such proportions are not critical, are linear alkyl sulfonate, sodium salt ("Calsoft LAS-99" by Pilot Chemicals), ethoxylated linear alcohols (Tergitol S by Union Carbide), and ethoxylated alkyl phenols (Triton X-100 by Rohm and Haas Co.). In this connection, any suitable surfactant can be employed which will protect the surface of the tablet, and also enhance solubilization thereof into the use solution.

I claim:

1. A method of producing sodium silicate particles having inherent self-binding properties which comprises heating under a pressure of at least about 500 lbs. per sq. inch an aqueous sodium silicate liquid dispersion having a sodium silicate content of about 45 to 80% by weight, and substantially instantaneously flashing off water therefrom by forcing such heated liquid under pressure into an expansion zone of lower pressure and at ambient temperature and in the absence of a moving column of air while simultaneously allowing rapid cooling of the particles.

2. The method of claim 1 wherein said liquid dispersion is superheated with the water thereof in liquid phase, the atmosphere in said expansion zone is static, and the resultant superheated liquid is ejected into said expansion zone through a single orifice nozzle resulting in formation of amorphous, burr-like spongy particles.

3. The method of claim 2 wherein flashed off water vapor is simultaneously vented from said expansion zone.

4. The method of claim 2 wherein said expansion zone is unheated.

5. The method of claim 2 wherein said sodium silicate dispersion has a sodium silicate content of about 50 to 75% by weight, the dispersion is superheated to about 125° to 378° C. under a pressure of about 500 to 5,000 pounds per square inch, the pressure drop in said expansion zone is at least about 500 pounds per square inch, and the resultant sodium silicate particles have a moisture content of about 15 to 30%.

6. Amorphous, burr-like spongy sodium silicate particles having a bulk density of about 8 to 35 lbs. per cubic foot obtained by the method of claim 1.

7. The sodium silicate of claim 6 having inherent binding properties, and in the form of a compressed mass wherein the sodium silicate is the inherent binder.

8. A method of producing spongy amorphous sodium silicate particles having non-glazed surfaces with projecting spurs and which possess self-binding properties, which comprises superheating an aqueous sodium silicate liquid dispersion under a pressure of at least 500 lbs. per sq. inch, said dispersion having a sodium silicate content of about 45 to 80% by weight, and flashing off the water from said dispersion substantially instantaneously by ejecting the liquid through a single orifice nozzle under at least said pressure into an expansion zone maintained at ambient temperature in which the atmosphere is static in the absence of a moving column of air and which has a pressure drop of at least 500 pounds per square inch.

References Cited

UNITED STATES PATENTS 2,730,170   1/1956   Bradford et al. _____ 159—2

FOREIGN PATENTS 23,391   1911   Great Britain.

OSCAR R. VERTIZ, Primary Examiner.

ARTHUR GREIF, Assistant Examiner.

U.S. Cl. X.R.

159—2; 252—133

PO-1050
(5/69)

UNITED STATES PATENT OFFICE
CERTIFICATE OF CORRECTION

Patent No. 3,450,494        Dated June 17, 1969

Inventor(s) Conrad J. Gaiser

It is certified that error appears in the above-identified patent and that said Letters Patent are hereby corrected as shown below:

Column 4, line 11, "treleased" should read --released--; the entire line 50 which starts with "pressure is" should read -- pressures, in order to release the aqueous sodium silicate --. Column 5, line 50, "S-25" should read --S-35--.

SIGNED AND
SEALED
SEP 15 1970

(SEAL)
Attest:

Edward M. Fletcher, Jr.
Attesting Officer

WILLIAM E. SCHUYLER, JR.
                                        Commissioner of Patents